United States Patent [19]
Lai

[11] Patent Number: 5,853,136
[45] Date of Patent: Dec. 29, 1998

[54] WIRE RECEIVING DEVICE

[76] Inventor: Cheng-Ting Lai, No. 3, Alley 3, Lane 320, Perng-Yi Road, Taiping, Taichung, Taiwan

[21] Appl. No.: 989,685

[22] Filed: Dec. 12, 1997

[30] Foreign Application Priority Data

Dec. 17, 1996 [TW] Taiwan ................................. 85219503

[51] Int. Cl.⁶ .................................................. B65H 75/38
[52] U.S. Cl. ..................................... 242/388.1; 242/396.4
[58] Field of Search ............................. 242/388.1, 396.4, 242/388.5, 378.1, 378.2, 378.3

[56] References Cited

U.S. PATENT DOCUMENTS

| | | |
|---|---|---|
| 655,052 | 7/1900 | Brunello . |
| 2,514,628 | 7/1950 | Cortes . |
| 2,565,339 | 8/1951 | Anderson . |
| 2,926,865 | 3/1960 | Humphreys . |
| 3,208,121 | 9/1965 | Price . |
| 4,901,938 | 2/1990 | Cantley et al. . |

*Primary Examiner*—Donald P. Walsh
*Assistant Examiner*—William A. Rivera
*Attorney, Agent, or Firm*—Rosenberg, Klein & Bilker

[57] ABSTRACT

A wire receiving device includes a main body having a board with a first and a second peripheral wall respectively extending from the board, the first peripheral wall having a cut-away and a recess respectively defined therein, a C-shaped ring rotatably mounted to the first peripheral wall and having an opening defined therethrough and a second recess defined in a lower edge thereof, a top cap rotatably mounted to the ring and having a shaft extending therefrom which extends through the board and a bottom by a bolt disk, a disk extending radially and outwardly from the shaft and having a notch defined therein, and a block movably received in the recess and the second recess so that a wire is hooked by a periphery defining the notch and wrapped around the shaft by rotating the top cap.

3 Claims, 3 Drawing Sheets

5,853,136

WIRE RECEIVING DEVICE

BACKGROUND OF THE INVENTION

1. Field of the Invention

The present invention relates to a device for receiving wires and, more particularly, to a wire receiving device in which wires are able to be wrapped therein by rotating a top cap thereof.

2. Brief Description of the Prior Art

Generally, electrical facilities require at least one wire to connect to an electrical power source. A personal computer may have five wires extending from a main case thereof, one connected to the power source, one coming from the monitor, one connected to a printer, one connected to a fax machine, and one connected to a mouse. The wires typically are collected and arranged in order when all the facilities are set. Traditionally, the wires are bound into strips and put along a corner of a wall. However, once the facilities need to move, the strips of wires have to be disengaged apart so as to identify which one extending from a certain machine to be moved such that the facilities can be conveniently moved. After the facilities are moved to the desired new positions, all the wires are again to be bounded together. This obviously wastes too much time to disengage and/or bind the wires.

The present invention intends to provide a wire receiving device which wraps a wire therein and is conveniently release the wire so as to mitigate and/or obviate the above-mentioned problems.

SUMMARY OF THE INVENTION

In one aspect of the present invention, there is provided a wire receiving device comprising a main body having a board with a first and a second peripheral wall respectively extending upwardly and downwardly from a periphery defining the board. The board has a central hole defined therethrough. The first peripheral wall has a cut-away defined therein and a recess defined in an outer periphery thereof.

A C-shaped ring is rotatably mounted to the first peripheral wall and has a second recess defined in a lower peripheral edge thereof and an opening defined therethrough.

A top cap is rotatably mounted to the ring and has a top board and a shaft which extends downwardly from an underside of the top board. A disk extends radially and outwardly from the shaft and has a notch defined therein.

A bottom is disposed to an underside of the board by extending a bolt through the bottom, the central hole and threadedly engaged with the shaft.

A block is movably received in the recess and the second recess so that when the block is shifted into the recess completely, the ring is rotatable corresponding to the main body. A wire is hooked by a periphery defining the notch and wrapped around the shaft by rotating the top cap.

It is an object of the present invention to provide a wire receiving device which wrappedly receives a wire therein.

It is another object of the present invention to provide a wire receiving device which is able to releases a wire wrappedly received therein conveniently.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
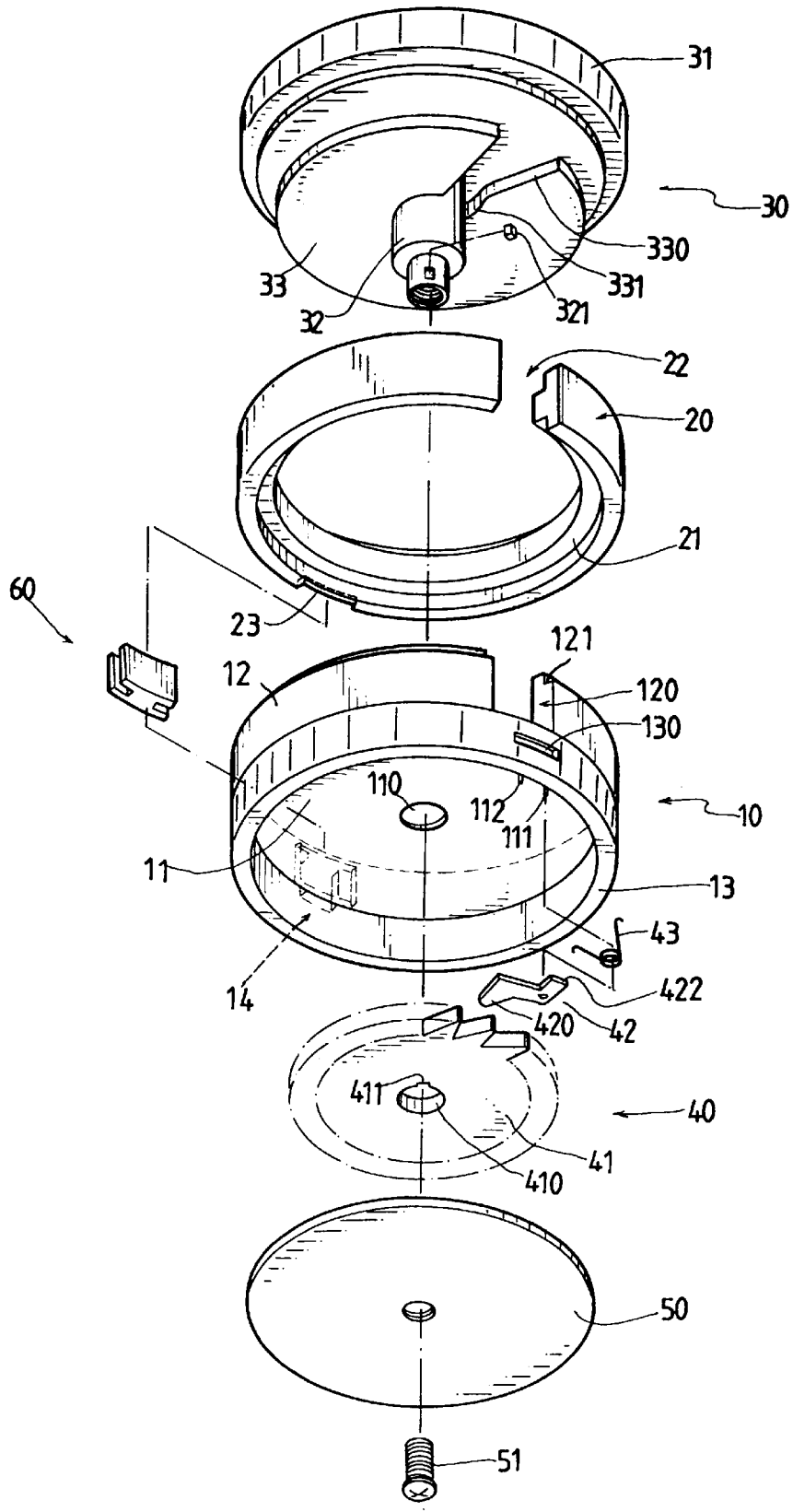
FIG. 1 is an exploded view of a wire receiving device in accordance with the present invention.

Referring to the drawings and initially to FIG. 1, a wire receiving device in accordance with the present invention generally includes a main body 10 having a board 11 with a first peripheral wall 12 extending upwardly from a periphery defining the board 11 and a second peripheral wall 13 extending downwardly from the periphery defining the board 11 which has a central hole 110 defined therethrough. The first peripheral wall 12 has a cut-away 120 defined therein and a recess 14 defined in an outer periphery thereof. An annular shoulder portion 121 is formed in a top of the first peripheral wall 12.

A C-shaped ring 20 is received in the annular shoulder portion 121 and rotatably mounted to the first peripheral wall 12. The ring 20 has a second recess 23 defined in a lower peripheral edge thereof and an opening 22 defined therethrough to form the C-shaped configuration. An annular flange 21 extends inwardly and radially from an inner periphery of the ring 20 so as to rotatably mount to the first peripheral wall 12.

A ratchet assembly 40 includes a ratchet 41 disposed to an underside of the board 11 and has a hole 410 defined therein, a key way 411 defined in the ratchet 41 and communicating with the hole 410. A pawl member 42 is pivotally connected a stud 111 extending from the underside of the board with a torsion spring 43 mounted to the stud 111 so that one of two legs of the torsion spring 43 is mounted to a first end 420 of the pawl member 42 and the other leg of the torsion spring 43 is mounted to a second stud 112 next to the stud 111 so that the first end 420 of the pawl member 42 is engaged with the ratchet 41 by a force of the torsion spring 43. The second peripheral wall 13 has an aperture 130 defined therethrough so that a second end 422 of the pawl member 42 extends from the aperture 130. When pushing the second end 422 of the pawl member 42, the first end 420 of the pawl member 41 is disengaged form the ratchet 41.

A top cap 30 is rotatably mounted to the ring 20 and has a top board 31 and a shaft 32 which extends downwardly from an underside of the top board 31. A disk 33 having a central opening 331 extends radially and outwardly from the shaft 32 and has a notch 330 defined therein.

A bottom 50 is disposed to an underside of the ratchet 41 by extending a bolt 51 through the bottom 50, the hole 410, the central hole 110 and threadedly engaged with the shaft 32, the shaft 32 has a key 321 disposed to an outer periphery thereof so as to be received in the key way 411 so that the ratchet 41 is rotated together with the shaft 32.

A block 60 is movably received in the recess 14 and the second recess 23. The block 60 is a H-shaped member so as to be received in the recess 14 having a corresponding inner periphery and the second recess 23. When the block 60 is shifted downwardly into the recess 14 completely, the ring 20 is rotatable corresponding to the main body 10, and when the block 60 is received both in the recess 14 and the second recess 23, the ring 20 is limited from rotating corresponding to the main body 10.

Figure 2:
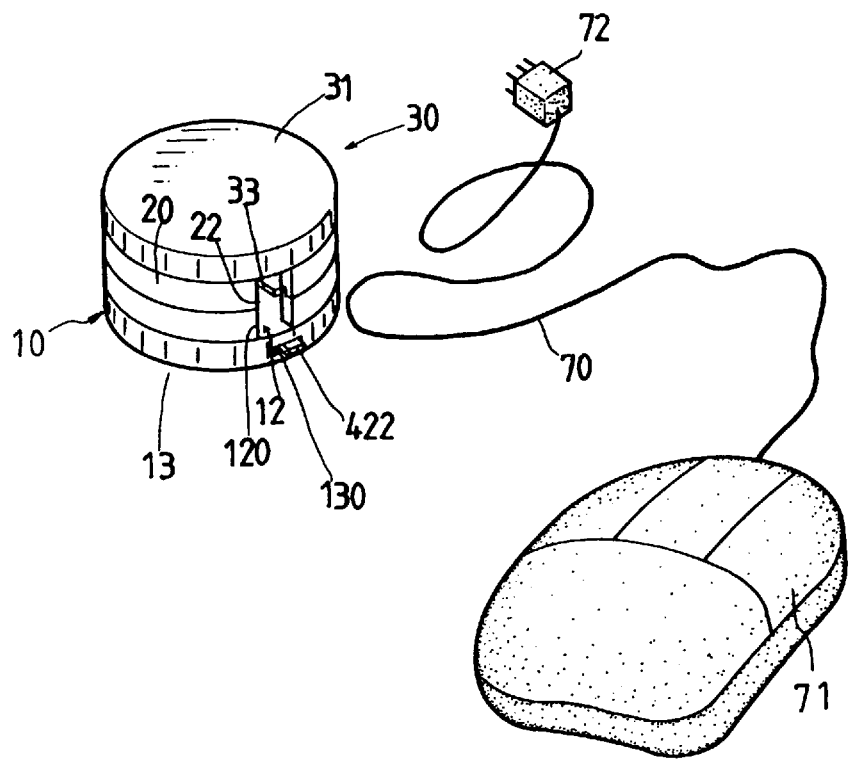
FIG. 2 is an illustrative view to show the device and a computer mouse and a wire of the mouse.
Figure 3:
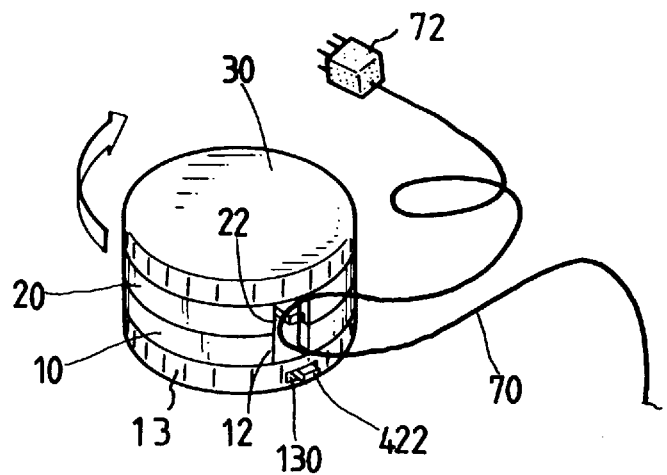
FIG. 3 is an illustrative view to show the device and a computer mouse wherein the wire of the mouse is hooked with a disk in the device.
Figure 4:
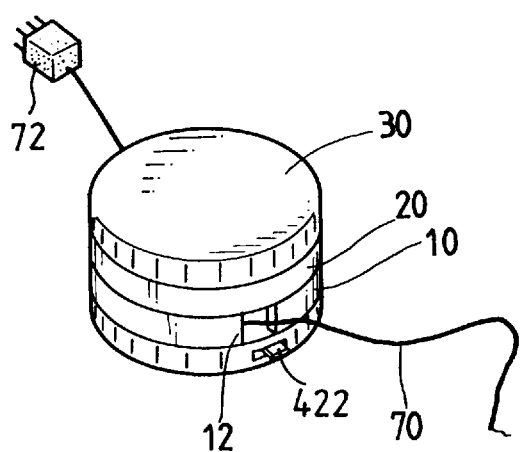
FIG. 4 is a perspective view of the device and the computer mouse with the wire of the computer mouse received in the device in accordance with the present invention.

Please refer to FIGS. 2 and 3, the cut-away 120 communicates with the opening 22 when a wire 70 of a computer mouse 71 is not received in the device. The wire 70 is looped at a suitable position as shown in FIG. 3 and the loop portion is inserted via the opening 22 and the cut-away 120 to be engaged with a periphery defining the notch 330 of the disk 33. The top cap 30 is then rotated to wrap the wire 70 around the shaft 32 till a desired length of the wire 70 is left. The block 60 is then shifted downwardly to be completely received in the recess 14 so that the ring 20 is rotated corresponding to the main body 10 as shown in FIG. 4 to let the opening 22 be located on a different position corresponding to that of the cut-away 120. The block 60 is shifted upwardly to be partly received in the second recess 23 to prevent the ring 20 from rotating. Accordingly, the length from the computer mouse 71 to the plug 72 is controlled. When releasing the wire 70 from the device, the block 60 is shifted downwardly and the second end of the pawl member 422 is pushed so as to rotate the top cap 30 in a reverse direction to let the wire 70 be able to be pulled from the device.

Although the invention has been explained in relation to its preferred embodiment, it is to be understood that many other possible modifications and variations can be made without departing from the spirit and scope of the invention as hereinafter claimed.

What is claimed is:

1. A wire receiving device comprising:

a main body having a board with a first peripheral wall extending upwardly from a periphery defining said board and a second peripheral wall extending downwardly from said periphery defining said board, said first peripheral wall having a cut-away defined therein and a recess defined in an outer periphery thereof, said board having a central hole defined therethrough;

a C-shaped ring rotatably mounted to said first peripheral wall and having a second recess defined in a lower peripheral edge thereof and an opening defined therethrough;

a top cap rotatably mounted to said ring and having a top board and a shaft which extends downwardly from an underside of said top board, a disk extending radially and outwardly from said shaft and having a notch defined therein;

a bottom disposed to an underside of said board by extending a bolt through said bottom, said central hole and threadedly engaged with said shaft, and a block movably received in said recess and said second recess so that when said block is shifted into said recess completely, said ring is rotatable corresponding to said main body, and when said block is received both in said recess and said second recess, said ring is limited from rotating corresponding to said main body.

2. The device as claimed in claim 1 wherein a ratchet is fixedly mounted to said shaft, a pawl member having two ends pivotally connected to said underside of said board and engagable to said ratchet, said second peripheral wall having an aperture defined therethrough so that one of said two ends of said pawl member extends from said aperture.

3. The device as set forth in claim 1 wherein said first peripheral wall has an annular shoulder portion formed in a top thereof so that said ring is rotatably received in said shoulder portion.

* * * * *